(12) United States Patent
Takenoshita et al.

(10) Patent No.: US 7,918,412 B2
(45) Date of Patent: Apr. 5, 2011

(54) RECORDING TAPE CARTRIDGE

(75) Inventors: Kenji Takenoshita, Kanagawa (JP);
Shozo Onmori, Kanagawa (JP); Yosuke Sumiya, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/382,735

(22) Filed: Mar. 23, 2009

(65) Prior Publication Data
US 2009/0242682 A1 Oct. 1, 2009

(30) Foreign Application Priority Data

Mar. 31, 2008 (JP) .................................. 2008-090992

(51) Int. Cl.
*G11B 23/107* (2006.01)
(52) U.S. Cl. ...................................... 242/348; 360/132
(58) Field of Classification Search .................. 242/347, 242/348, 348.1, 332.4; 360/132
See application file for complete search history.

(56) References Cited

U.S. PATENT DOCUMENTS

| | | | |
|---|---|---|---|
| 6,702,215 B2* | 3/2004 | Stamm et al. ................. | 242/348 |
| 6,824,320 B1* | 11/2004 | Kerr et al. ..................... | 242/348 |
| 7,145,751 B2* | 12/2006 | Hiraguchi ..................... | 360/132 |
| 7,212,118 B1* | 5/2007 | Wojciechowski et al. ..... | 360/134 |
| 7,227,721 B1* | 6/2007 | Kientz et al. ................. | 360/132 |
| 7,516,913 B2* | 4/2009 | Ashikawa ..................... | 242/348 |
| 7,530,515 B2* | 5/2009 | Battles et al. .............. | 242/332.4 |
| 2003/0002214 A1* | 1/2003 | Kitamura et al. ............. | 360/132 |
| 2006/0077585 A1* | 4/2006 | Larson .......................... | 360/132 |
| 2006/0180694 A1* | 8/2006 | Battles et al. ................. | 242/348 |
| 2008/0218901 A1* | 9/2008 | Haustein et al. ............... | 360/90 |

FOREIGN PATENT DOCUMENTS

JP 10172263 A 6/1998

* cited by examiner

*Primary Examiner* — William A Rivera
(74) *Attorney, Agent, or Firm* — Jean C. Edwards, Esq.; Akerman Senterfitt LLP

(57) ABSTRACT

A recording tape cartridge that can secure the attached region of an RFID in a case is provided including: a case that has an upper case and a lower case and houses a reel around which a recording tape is wound; a restricting wall that is formed at least in the lower case and defines an area in which the reel is housed; a housing portion that is formed between the restricting wall and the corner of the case; and a planar RFID that is provided in the housing portion such that the rotational axis direction of the reel is a normal line direction.

18 Claims, 10 Drawing Sheets

RECORDING TAPE CARTRIDGE

CROSS-REFERENCE TO RELATED APPLICATION

This application claims priority under 35 USC 119 from Japanese Patent Application No. 2008-090992, filed Mar. 31, 2008, the disclosure of which is incorporated herein by reference.

BACKGROUND

1. Field of the Invention

The present invention relates to a recording tape cartridge that houses a recording tape, such as a magnetic tape, used as a recording and reproducing medium for a computer in a case.

2. Related Art

There has conventionally been known a recording tape cartridge in which a recording tape, such as a magnetic tape, used as a data recording and reproducing medium (data backup) for a computer is wound around a synthetic resin reel and the reel is singly housed in a case. A non-contact type memory board that stores various information such as the recording capacity and the recording form of the recording tape may be incorporated into the one-reel (single-reel) type recording tape cartridge. The memory board may be accessed by a dedicated reading and writing device provided in a drive device or a library device.

There has conventionally been proposed a two-reel type video cassette that has on its back label side a non-contact type IC tag (RFID) that may be accessed by a typical (inexpensive) reading and writing device, unlike the memory board (see Japanese Patent Application Laid-Open (JP-A) No. 10-172263). The IC tag needs to be formed to have a long antenna length in order to increase its communication distance. So, the IC tag is formed to have a certain amount of size (area). The area of the back label of the two-reel type video cassette is large. So, the IC tag may be easily attached.

The entire size of the one-reel type recording tape cartridge is about half that of the two-reel type video cassette. The size of the back label of the one-reel type recording tape cartridge is about half that of the two-reel type video cassette. It is difficult to attach the IC tag to the back label of the one-reel type recording tape cartridge.

Further, in a case where the IC tag is bonded to the inside of the case by an adhesive, the IC tag is separated and falls (falls off) in the housing area of the reel due to the deterioration (the lowered durability) of the adhesive with elapsed time. The rotation of the reel may be hindered by the fallen off IC tag. Thus, when the IC tag having a certain amount of size (area) is attached to the inside of the case of the recording tape cartridge, the attached region for the IC tag is hard to be secured.

SUMMARY OF THE INVENTION

An object of the present invention is to obtain a recording tape cartridge that may secure the attached region of an RFID in a case.

To achieve the above object, a recording tape cartridge of a first aspect of the invention including: a case that includes an upper case and a lower case and houses a reel around which a recording tape is wound; a restricting wall that is formed at least in the lower case and defines an area in which the reel is housed; a housing portion that is formed between the restricting wall and a corner portion of the case; and a planar radio frequency identification (RFID) tag that is provided in the housing portion such that a rotational axis direction of the reel is a normal line direction of the planar radio frequency identification tag.

In the invention of the first aspect, the planar RFID may be arranged in the housing portion formed between the restricting wall that defines the housing area of the reel and the corner of the case such that the rotational axis direction of the reel is a normal line direction. The attached region of the RFID can be secured.

In the recording tape cartridge of a second aspect in the recording tape cartridge of the first aspect, a part of an antenna portion of the radio frequency identification tag is folded toward the rotational axis direction of the reel.

In the invention of the second aspect, the RFID can be accessed, not only from the rotational axis direction of the reel, but also from the direction orthogonal to the rotational axis direction of the reel. The communication performance for accessing the RFID can be improved.

In the recording tape cartridge of a third aspect in the recording tape cartridge of the first or second aspect, a peripheral edge portion of the radio frequency identification tag is sandwiched between a peripheral wall of the upper case and a peripheral wall of the lower case.

In the invention of the third aspect, the front-rear direction and the left-right direction of the RFID arranged in the housing portion can be positioned.

In the recording tape cartridge of a fourth aspect in the recording tape cartridge of any one of the first to third aspects, the radio frequency identification tag is supported from below by a supporting portion formed in the lower case.

In the invention of the fourth aspect, the up-down direction of the RFID arranged in the housing portion can be positioned.

In the recording tape cartridge of a fifth aspect in the recording tape cartridge of any one of the first to fourth aspects, the radio frequency identification tag is held by a holding mechanism that is formed in a screw boss into which a screw that joins the upper case and the lower case is screwed.

In the invention of the fifth aspect, the up-down direction of the RFID arranged in the housing portion can be positioned and the RFID can be fixed.

In the recording tape cartridge of a sixth aspect in the recording tape cartridge of the second aspect, an one end portion of the radio frequency identification tag at which the part of the antenna portion of the radio frequency identification tag is formed is folded toward the rotational axis direction of the reel, and another end portion at a peripheral edge portion of the radio frequency identification tag is sandwiched between a peripheral wall of the upper case and a peripheral wall of the lower case.

In the recording tape cartridge of a seventh aspect in the recording tape cartridge of the third aspect, a protruding portion that is formed at the peripheral edge portion of the radio frequency identification tag is sandwiched between the peripheral wall of the upper case and the peripheral wall of the lower case.

In the recording tape cartridge of an eighth aspect in the recording tape cartridge of the third aspect, a protruding portion that is formed at the peripheral edge portion of the radio frequency identification tag is supported at the supporting portion.

In the recording tape cartridge of a ninth aspect in the recording tape cartridge of the first aspect, protruding portions that are formed at peripheral edge portions of the radio frequency identification tag are supported at supporting portions formed in the lower case respectively.

In the recording tape cartridge of a tenth aspect in the recording tape cartridge of the fifth aspect, a penetration portion for the screw boss is formed at the radio frequency identification tag.

In the recording tape cartridge of an eleventh aspect in the recording tape cartridge of the fifth aspect, the holding mechanism includes a first flange portion formed at the screw boss at the lower case side and a second flange portion formed at the screw boss at the upper case side.

As described above, the invention can provide the recording tape cartridge that can secure the attached region of the RFID in the case.

DETAILED DESCRIPTION OF THE INVENTION

Figure 1:
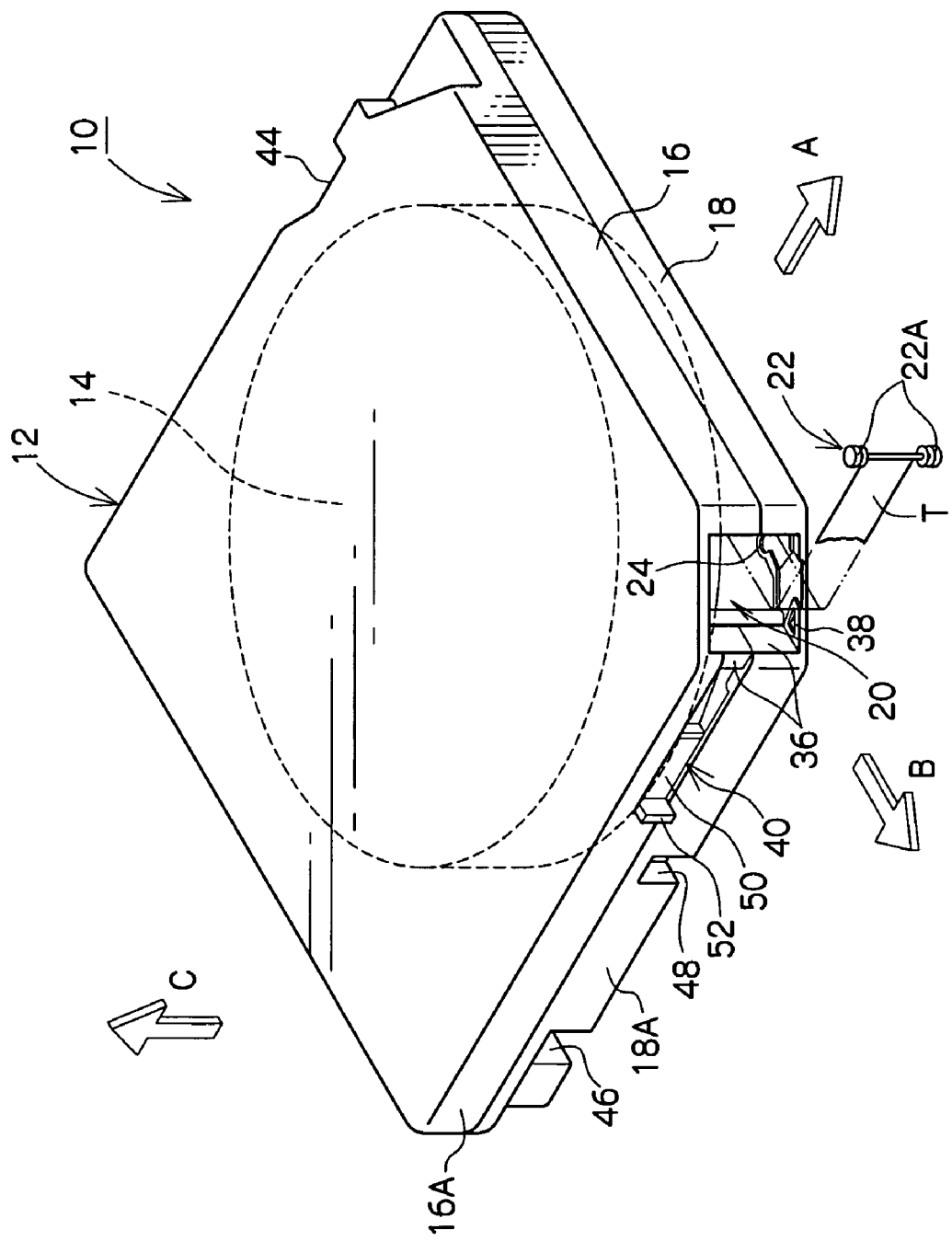
FIG. 1 is a schematic perspective view of a recording tape cartridge.

An exemplary embodiment of the present invention will be described below in detail based on examples illustrated in the drawings. For convenience of the description, in FIG. 1, the inserting direction of a recording tape cartridge 10 into a drive device (not illustrated) is indicated by an arrow A and is the front direction (the front side) of the recording tape cartridge 10. An arrow B direction orthogonal to the arrow A is the right direction (the right side). The direction orthogonal to the arrow A direction and the arrow B direction is indicated by an arrow C and is the up direction (the up side) of the recording tape cartridge 10.

Figure 2:
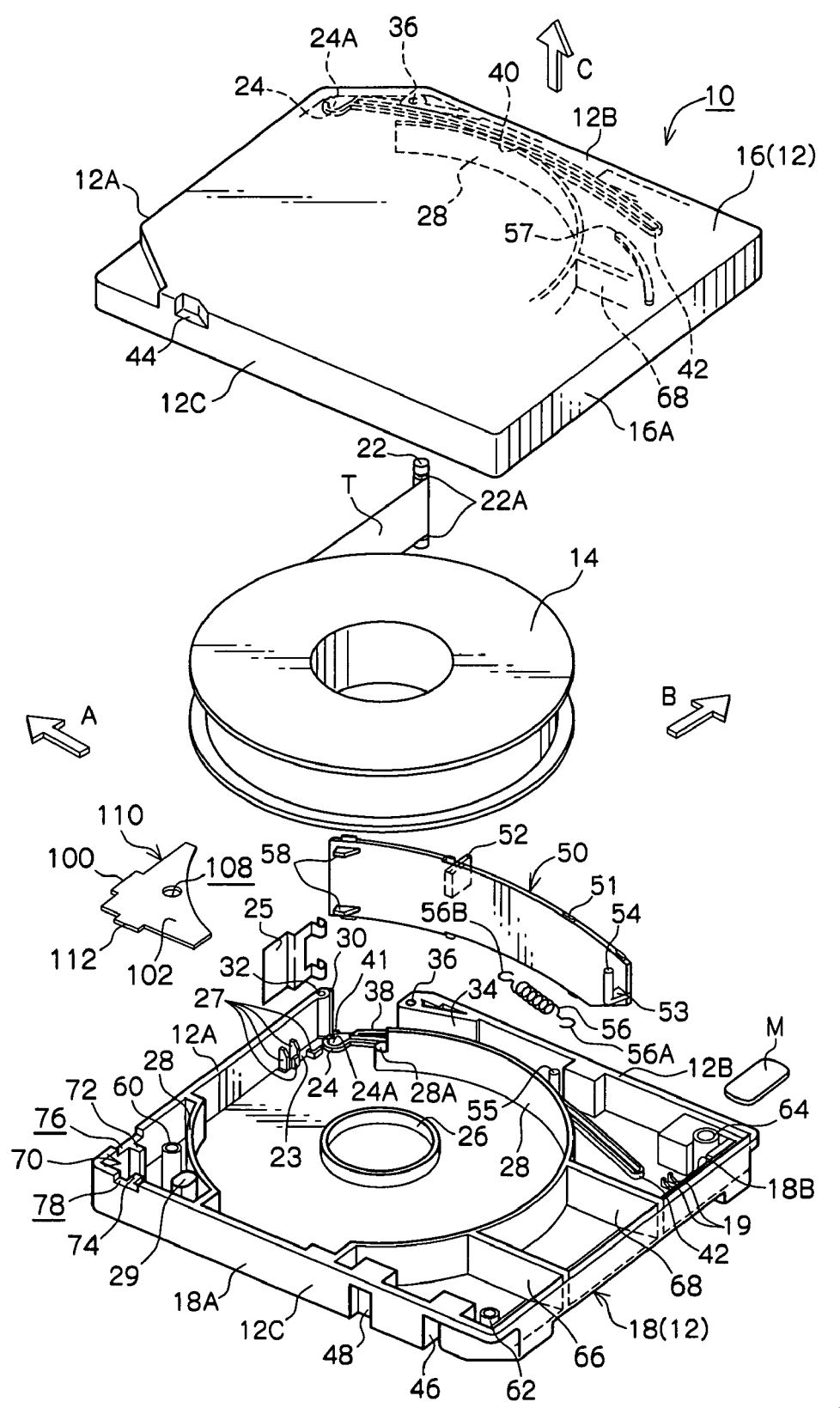
FIG. 2 is a schematic exploded perspective view of the recording tape cartridge.

As illustrated in FIGS. 1 and 2, the recording tape cartridge 10 singly and rotationally houses a reel 14 around which a recording tape T, such as a magnetic tape, that is an information recording and reproducing medium is wound, in a case 12 in a substantially rectangular shape in plan view. Each of an upper case 16 and a lower case 18 of the case 12 has a right front corner that is one corner on the head side of the case 12 in the inserting direction into the drive device being diagonally cut away in plan view. The upper case 16 and the lower case 18 are joined by butting peripheral walls 16A and 18A. A housing space that houses the reel 14 is formed in the case 12.

The cut-away corners of the peripheral wall 16A of the upper case 16 and the peripheral wall 18A of the lower case 18 is an opening 20 for drawing out the recording tape T. The free end of the recording tape T drawn out from the opening 20 is connected to a leader pin 22 that is engaged by a drawing-out member (not illustrated) of the drive device and is drawably operated. Annular grooves 22A are formed at both ends of the leader pin 22 protruded from the ends in the width direction of the recording tape T. The annular grooves 22A engage a hook of the drawing-out member. When the recording tape T is drawn out, the hook may not be brought into contact with and not damage the recording tape T.

Inside the opening 20 of the case 12, a pair of upper and lower, pin holding portions 24 that position and hold the leader pin 22 in the case 12 are provided. The pin holding portions 24 have a substantially semi-cylindrical shape. Both ends of the leader pin 22 in an upright state are held in concave portions 24A. The recording tape T drawing-out side of each of the pin holding portions 24 is opened and is an entrance for the entry and exit of the leader pin 22.

A plate spring 25 is fixedly arranged near the pin holding portions 24 such that the base of the plate spring 25 is inserted into spring holding portions 27 and grooves 23 provided on the inner surfaces of front walls 12A (the portions in which the outer surfaces of the peripheral walls 16A and 18A are directed in the arrow A direction). The two-branched front ends of the plate spring 25 engage the upper and lower ends of the leader pin 22 to hold the leader pin 22 in the pin holding portions 24. When the leader pin 22 enters into and exits from the pin holding portions 24, the front ends of the plate spring 25 are elastically deformed, as needed, to allow the movement of the leader pin 22.

A gear opening 26 for exposing a reel gear (not illustrated) of the reel 14 to the outside is provided in the center portion of the lower case 18. The reel gear engages a driving gear (not illustrated) of the drive device so as to rotationally drive the reel 14 in the case 12. Play restricting walls (restricting walls) 28 (in a substantially arcuate shape in plan view) are partially protruded from the inner surfaces of the upper case 16 and the lower case 18 and are located on the circular track (on the circumference) coaxially with the gear opening 26. The area in which the reel 14 is housed is defined by the play restricting walls 28. The reel 14 is housed inside the play restricting walls 28 and is held so as not to be rattled.

A bag portion 28A formed in its inside with a position restricting hole is joined to the end of the play restricting wall 28 near the opening 20 in the lower case 18. Inside the left front corner of the lower case 18, a bag portion 29 formed with a position restricting hole as a long hole is provided so as to be spaced from the play restricting wall 28. The bag portions 28A and 29 are arranged on a straight line along the arrow B direction. The peripheries of the position restricting holes on the lower surface side (the portions that have a wall thickness equal to or larger than that of the bag portions 28A and 29) are positioning reference surfaces with respect to the drive device.

Except for the end joined to the bag portion 28A, the end of the play restricting wall 28 of the lower case 18 is joined to the peripheral wall 18A to partition the outside of the play restricting wall 28 and the housing area (the housing space) of the reel 14. Likewise (symmetrically in the up-down direction), the end of the play restricting wall 28 of the upper case 16 is joined to the peripheral wall 16A to partition the outside of the play restricting wall 28 and the housing area (the housing space) of the reel 14. The strength of the case 12 may be improved. The dust-proof properties of the housing area of the reel 14 may be improved.

Coupling ribs 66 and 68 are spaced at a predetermined pitch in the left-right direction (or are symmetrical in the left-right direction). In the lower case 18, the outer circumferential surface of the play restricting wall 28 on the rear side of the case 12 and a rear inner surface 18B are integrally joined by the coupling ribs 66 and 68. The coupling ribs 66 and 68 are formed to have a planar shape and the same length such that the front-rear direction of the case 12 is the longitudinal direction. In the same manner, the coupling ribs 66 and 68 are formed on the upper case 16.

A screw boss 60 of the lower case 18 paired with the screw boss 60 of the upper case 16 is provided in a predetermined position between the front wall 12A and the play restricting wall 28 on the side in which the bag portion 29 is provided. A screw boss 62 of the lower case 18 paired with the screw boss 62 of the upper case 16 is provided in a predetermined position at the corner between the left end of the rear inner surface 18B of the lower case 18 and a left wall 12C. A screw boss 64 of the lower case 18 paired with of the screw boss 64 of the upper case 16 is provided in a predetermined position at the corner between the right end of the rear inner surface 18B of the lower case 18 and a right wall 12B. The screw bosses 60, 62, and 64 of the lower case 18 paired with the screw bosses 60, 62, and 64 of the upper case 16 are penetrated through the lower case 18 and are not penetrated through the upper case 16.

A pair of upper and lower, short inclined wall portions 30 are provided at the right ends of the front walls 12A of the case 12. The inclined wall portions 30 define the front edge of the opening 20. The inclined wall portions 30 are bendably formed along the opening surface of the opening 20. The inclined wall portions 30 are dust-proof walls such that the front end of a later-described door 50 in a substantially arcuate shape in plan view enters inside the closed opening 20 so as not to cause a gap into which dust may enter. A pair of upper and lower screw bosses 32 are joined to the inside of the front walls 12A near the left sides of the inclined wall portions 30.

A pair of upper and lower, inclined wall portions 34 are provided inside the front ends of the right walls 12B (the portions in which the outer surfaces of the peripheral walls 16A and 18A are directed in the arrow B direction) of the case 12. The inclined wall portions 34 have a shape substantially along the outer circumferential surface of the door 50 in plan view. The front end faces of the inclined wall portions 34 define the rear edge of the opening 20. A pair of upper and lower screw bosses 36 are provided at the front ends of the inclined wall portions 34.

A slit 40 is provided in the right wall 12B of the case 12. The slit 40 has a predetermined length and is a window portion that communicates the inside and outside of the case 12. The slit 40 exposes an operating protrusion 52 of the door 50. The slit 40 is formed by cutting away the front lower portion of the peripheral wall 16A of the upper case 16 configuring the right wall 12B and is opened to the opening 20. It is preferable that the slit 40 be formed by leaving a portion of the peripheral wall 16A on the upper side. The rigidity of the case 12 may be maintained. It is more preferable that the upper wall defining the slit 40 be integrally joined to the inclined wall portion 34.

A concave portion 48 is formed rearwardly of the lower case 18. In the concave portion 48, the portion except for the upper end of the peripheral wall 18A is concave inwardly of the case 12 in a substantially "U" shape in cross-sectional view and is concave upward from the lower surface of the case 12 (the bottom plate is cut away). The concave portion 48 is an engaging portion that engages a drawing-in member (not illustrated) of the drive device. The bottom surface (the downward surface) of the concave portion 48 is a positioning reference surface in the drive device.

A concave portion 46 is formed rearwardly of the concave portion 48. In the concave portion 46, the portion except for the upper end of the peripheral wall 18A is concave inwardly of the case 12 in a substantially "U" shape in cross-sectional view and is concave upward from the lower surface of the case 12 (the bottom plate is cut away). The concave portion 46 is an engaging portion that engages a gripping member (not illustrated) of a library device. Such concave portions 46 and 48 are provided to improve the torsional strength of the case 12 (the lower case 18).

A concave portion 44 in a substantially trapezoidal shape in plan view is formed in the upper surface portion of the left wall of the upper case 16. The concave portion 44 is an engaging portion that engages a holding member (not illustrated) provided in the drive device in order to cancel the rotation moment with the movement of the door 50 in the opening direction when the opening 20 is opened.

Guide wall portions 42 are erected in the upper case 16 and the lower case 18. The guide wall portions 42 have a predetermined height (e.g., a height of about 1.0 mm to 1.5 mm) and support convex portions 51 of the later-described door 50 so as to sandwich the convex portions 51 from both the inner surface and the outer surface, from near the opening 20 to near the portion in which the play restricting wall 28 is closest to the right wall 12B (hereinafter, called a front half) and from near the rear end of the slit 40 to near the rear wall (hereinafter, called a rear half).

The lengths of the guide wall portions 42 of the upper case 16 and the lower case 18 are different. The rear half of the guide wall portion 42 of the upper case 16 is formed to be longer than the rear half of the guide wall portion 42 of the lower case 18. This is because a later-described memory board M is arranged on the right wall 12B side of the rear inner surface 18B of the lower case 18. The rear ends of the rear halves of the guide wall portions 42 are closed in a substantially arcuate shape in plan view. The convex portions 51 on the most rear side of the upper and lower guide wall portions 42 are restricted such that the door 50 may not be moved more rearward.

The front ends of the front halves of the guide wall portions 42 are opened and are extended to the position that may not hinder the entry and exit of the leader pin 22 (in the drawing, the position that is rearwardly of the case 12 from the pin holding portions 24 and is at a distance that is about half the opening width of the opening 20). Guide wall portions 41 each having an opened rear end are erected near the inclined wall portions 30 so as to be located on the extension line of the guide wall portions 42. The guide wall portions 41 are not extended to the rear side from the front ends of the pin holding portions 24 such that the rear ends of the guide wall portions 41 may not hinder the entry and exit of the leader pin 22. The door 50 closes the opening 20 in the state that the front end of the door 50 enters into the guide wall portions 41.

The guide wall portions 41 and the front halves of the guide wall portions 42 are formed so as to be slightly lower than the rear halves of the guide wall portions 42. The height of the guide wall portions 41 and the front halves of the guide wall portions 42 are formed to be about 1 mm. The height of the rear halves of the guide wall portions 42 is formed to be about 1.5 mm. This is for securing the space in which the drawing-out member provided in the drive device enters into the opening 20. The guide wall portions 41 and the front halves of the guide wall portions 42 are lowered. According to this, as described later, the plate width (height) of the door 50 in the front half portion (the portion that at least closes the opening 20) is formed to be larger.

Ribs 38 are integrated with the outer guide wall portions 42 exposed from the opening 20 to have a substantially trapezoidal shape in plan view. The ribs 38 are erected on the inner surface of the upper case 16 and the inner surface of the lower case 18 so as to have the same height as that of the guide wall portions 42. The strength of the upper case 16 and the lower case 18 in the opening 20 may be secured by the ribs 38. The inner guide wall portions 42 are integrally joined to the pin holding portions 24. It is desirable that the pin holding portions 24 be formed so as to have a height substantially equal to or larger than that of the guide wall portions 42 integrally joined to the pin holding portions 24.

The upper case 16 and the lower case 18 are fixed (joined) by screwing screws 90 (see FIG. 9B) into the screw bosses 32 and 36 located near the edge of the opening 20 and the screw bosses 60, 62, and 64 from the lower surface of the lower case 18. The corner portions at both ends of the opening 20 are defined by the free ends of the inclined wall portions 30 (the front walls 12A) and the inclined wall portions 34 (the right walls 12B). The corner portions that are disadvantageous in strength and easily collide with the ground by falling are strongly joined. The case 12, if dropped, may not be deformed by the weight of the entire recording tape cartridge 10 and may not occur buckling and be shifted.

The opening 20 is opened and closed by the door 50 as a shielding member. The plate width (height) of the portion of the door 50 that at least closes the opening 20 is formed to be substantially the same as the opening height of the opening 20. The rear side from the portion is formed to be slightly smaller (lower). The plate length is formed to be substantially larger than the opening width of the opening 20. The door 50 is formed in a substantially arcuate shape in plan view that is curved in the plate thickness direction so as to be moved along a predetermined circumference.

The front end of the door 50 enters into the guide wall portions 41 to close the opening 20. The door 50 is slidably moved (rotated) substantially rearward along the predetermined circumference to open the opening 20. When the outer circumferential surface of the door 50 near the front end of the door 50 reaches near the screw boss 36, the door 50 completely opens the opening 20. The door 50 is slidably moved (rotated) in the opposite direction of the direction that opens the opening 20, thereby closing the opening 20.

The door 50 is formed so as to be curved in an arcuate shape corresponding to the predetermined circumference as its moving track. In this exemplary embodiment, the position of the rotational center in the left-right direction is set to the vicinity of the left end of the case 12, and the position of the rotational center in the front-rear direction is set to the vicinity of the rear end of the slit 40. The moving track of the door 50 is closest to the right wall 12B of the case 12 near the rear end of the slit 40. The rotational center and radius of the door 50 may be determined, as needed, according to the positions of the front and rear edges (the inclined wall portions 30 and the screw boss 36) of the opening 20 determined by a request from the drive device and the angle of the opening surface of the opening 20 determined by a request from the library device.

The curved longitudinal size of the door 50 is determined such that the rear end of the door 50 is located in the right rear corner rearwardly of the concave portion 48 (near the concave portion 46) of the case 12 when the opening 20 is closed. The rear lower portion of the door 50 is diagonally cut away in order to avoid the memory board M arranged so as to be inclined at a predetermined angle θ by later-described position restricting ribs 19. It is preferable that at least one of the inner surface and the outer surface at the front end of the door 50 be formed to be a taper surface so as to smoothly enter between the guide wall portions 41.

The convex portions 51 are protruded from the upper surface and the lower surface of the door 50. The convex portions 51 abut the guide surfaces of the guide wall portions 42 (the inner surfaces opposite each other) and the inner surface of the upper case 16 and the inner surface of the lower case 18 between the guide wall portions 41 and the guide wall portions 42, thereby guiding the door 50 in the opening and closing directions of the opening 20. The convex portions 51 are formed in a substantially elliptic shape in plan view and are long along the longitudinal direction of the door 50. Four convex portions 51 are protruded from each of the upper surface and the lower surface so as to be symmetrical in the up-down direction except for the convex portions 51 on the most rear side and to have a height substantially the same as that of the guide wall portions 42 (e.g., the front side from the boundary portion in which the plate width of the door 50 is different has a height of about 0.5 mm and the rear side has a height of about 1.5 mm). The convex portions 51 on the most rear side are not symmetrical in the up-and down direction because the rear lower portion of the door 50 is diagonally cut away.

Such convex portions 51 are provided to reduce the sliding resistance (friction) of the inner surface of the upper case 16 and the inner surface of the lower case 18 between the guide wall portions 41 and the guide wall portions 42 and the guide surfaces of the guide wall portions 41 and the guide wall portions 42. The door 50 may be smoothly slid with reduced resistance. The convex portions 51 formed in a substantially elliptic shape in plan view are more excellent in shock-proof properties than the convex portions 51 formed in a substantially circular shape in plan view. When a force is applied to the door 50 due to drop impact, not from the opening and closing directions, the convex portions 51 may not be folded.

The operating protrusion 52 as an operating portion is protruded along the diameter direction of the door 50 from the outer circumferential surface slightly forwardly of the center portion in the longitudinal direction of the door 50 (near the boundary portion in which the plate width of the door 50 is different). The operating protrusion 52 is exposed to the outside of the case 12 from the slit 40. The operating protrusion 52 is located so as to be slightly spaced from the rear end of the screw boss 36 when the opening 20 is closed. The operating protrusion 52 may be operated from the portion opened to the front side of the slit 40.

When the opening 20 is opened, the operating protrusion 52 is located so as to be slightly spaced from the rear edge of the slit 40. The convex portions 51 at the most rear ends abut the closed rear end of the guide wall portions 42. The inside and outside of the case 12 are communicated by the slit 40 for exposing the operating protrusion 52. The slit 40 is substantially closed all the time by the screw boss 36 and the door 50 over the substantially overall height in the case 12. The play restricting walls 28 as inner walls are provided in the case 12. The adhesion of dust to the recording tape T wound around the reel 14 may be prevented.

Stoppers 58 are protruded from the inner surface at the front end of the door 50. When the opening 20 is closed, the stoppers 58 abut the side surface at the upper end and the side surface at the lower end of the leader pin 22. The falling of the leader pin 22 from the pin holding portions 24 due to drop impact may be prevented. A coil spring 56 is a biasing member that biases the door 50 in the closing direction of the opening 20. The door 50 has a length to the right rear corner of the case 12 when the opening 20 is closed. The coil spring 56 is disposed by effectively using the space between the play restricting walls 28 and the right walls 12B at the right rear corner of the case 12 (the peripheral walls 16A and 18A).

A plate-shaped supporting portion 53 is integrally joined to the inner circumferential surface near the rear end of the door 50. A spring holding portion 54 is integrally protruded upward from the upper surface of the supporting portion 53.

A cylindrical spring engaging portion 55 is protruded upward from the inner surface of the lower case 18 near the concave portion 48. Ring-like attaching portions 56A and 56B are formed at both ends of the coil spring 56. The attaching portion 56B is inserted into the spring engaging portion 55 from above. The attaching portion 56A is inserted into the spring holding portion 54 from above. The coil spring 56 may be easily attached in the space.

A rib 57 is erected in a substantially arcuate shape in plan view on the inner surface of the upper case 16. The upper end of the spring holding portion 54 is slidably brought into contact with the rib 57 when the door 50 is opened and closed. When at least the door 50 starts to move (open), the rib 57 is disposed in the position and length such that the upper end of the spring holding portion 54 may be slidably brought into contact with the rib 57. The spring holding portion 54 that is moved against the biasing force of the coil spring 56 is preferably guided. The door 50 may be opened more stably (such that the door 50, when opened, is not wobbled by the biasing force of the coil spring 56).

The attaching portion 56A of the attached coil spring 56 is raised through the spring holding portion 54 due to a drop impact applied to the case 12. By the provision of the rib 57, the attaching portion 56A of the attached coil spring 56 may not be separated from the spring holding portion 54. The upper end of the spring engaging portion 55 is inserted between the play restricting wall 28 and the guide wall portion 42 of the upper case 16. The separation of the attaching portion 56B from the spring engaging portion 55 may be prevented.

The memory board M stores various information such as a recording capacity and a recording form and may be accessed in a non-contact manner. The memory board M is arranged so as to be inclined in the right rear portion of the lower case 18 at a predetermined angle θ (e.g., θ=45°). The rear inner surface 18B of the lower case 18 is inclined at the predetermined angle θ. The plural (e.g., two) position restricting ribs 19 are protruded in the left-right direction at a predetermined pitch from the inner surface of the lower case 18 forwardly of the case 12 from the rear inner surface 18B and rearwardly of the case 12 from the play restricting wall 28.

The memory board M is arranged on the rear inner surface 18B. The lower end of the memory board M is supported by the position restricting ribs 19. The memory board M is held so as to be inclined at the predetermined angle θ (so as not to be slipped and fall). It is desirable that the inclining angle θ of the rear inner surface 18B be 45° to access the memory board M from the lower surface and the rear surface of the case 12.

Figure 3:
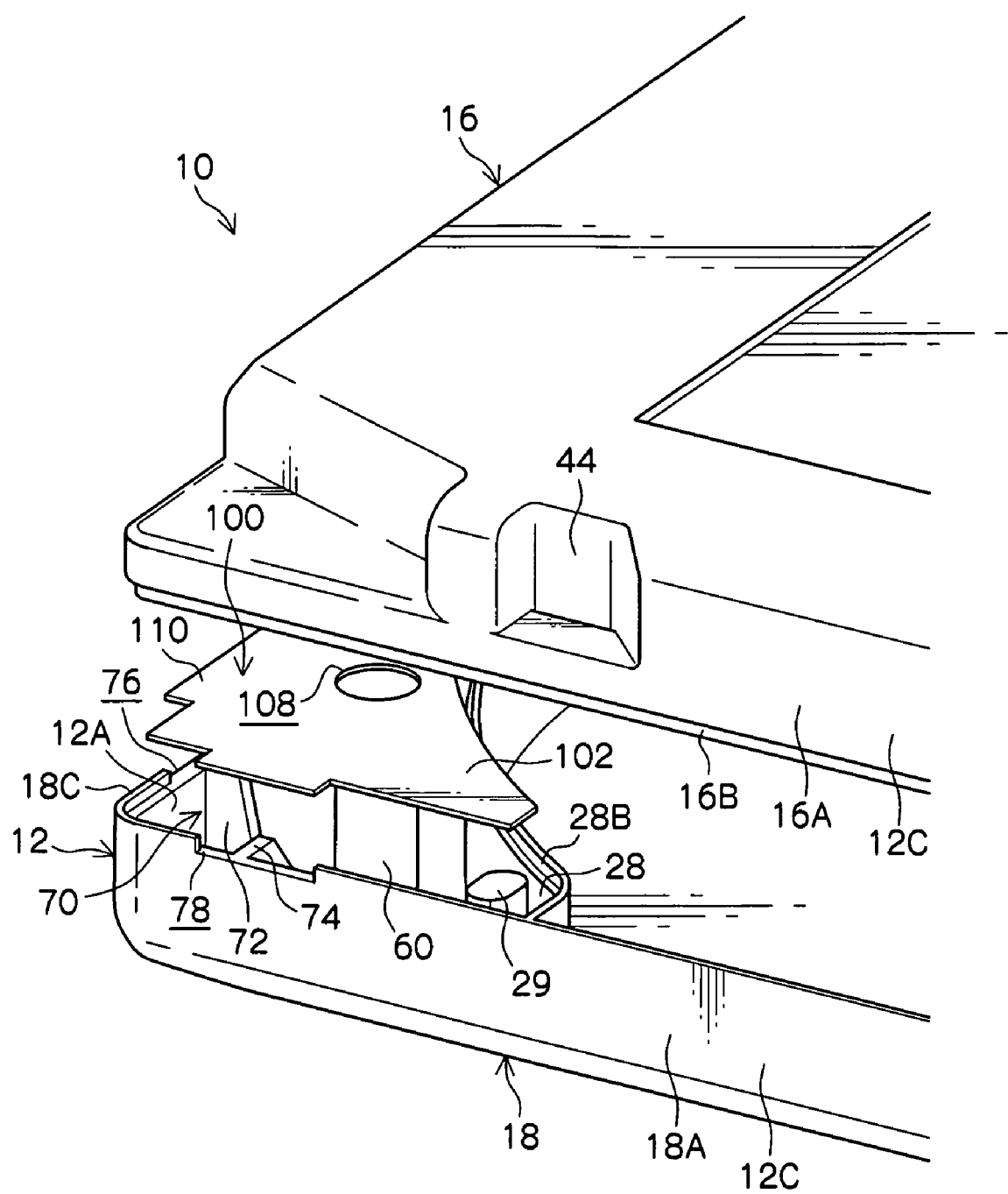
FIG. 3 is a schematic perspective view illustrating an IC tag housed in a housing portion.
Figure 4:
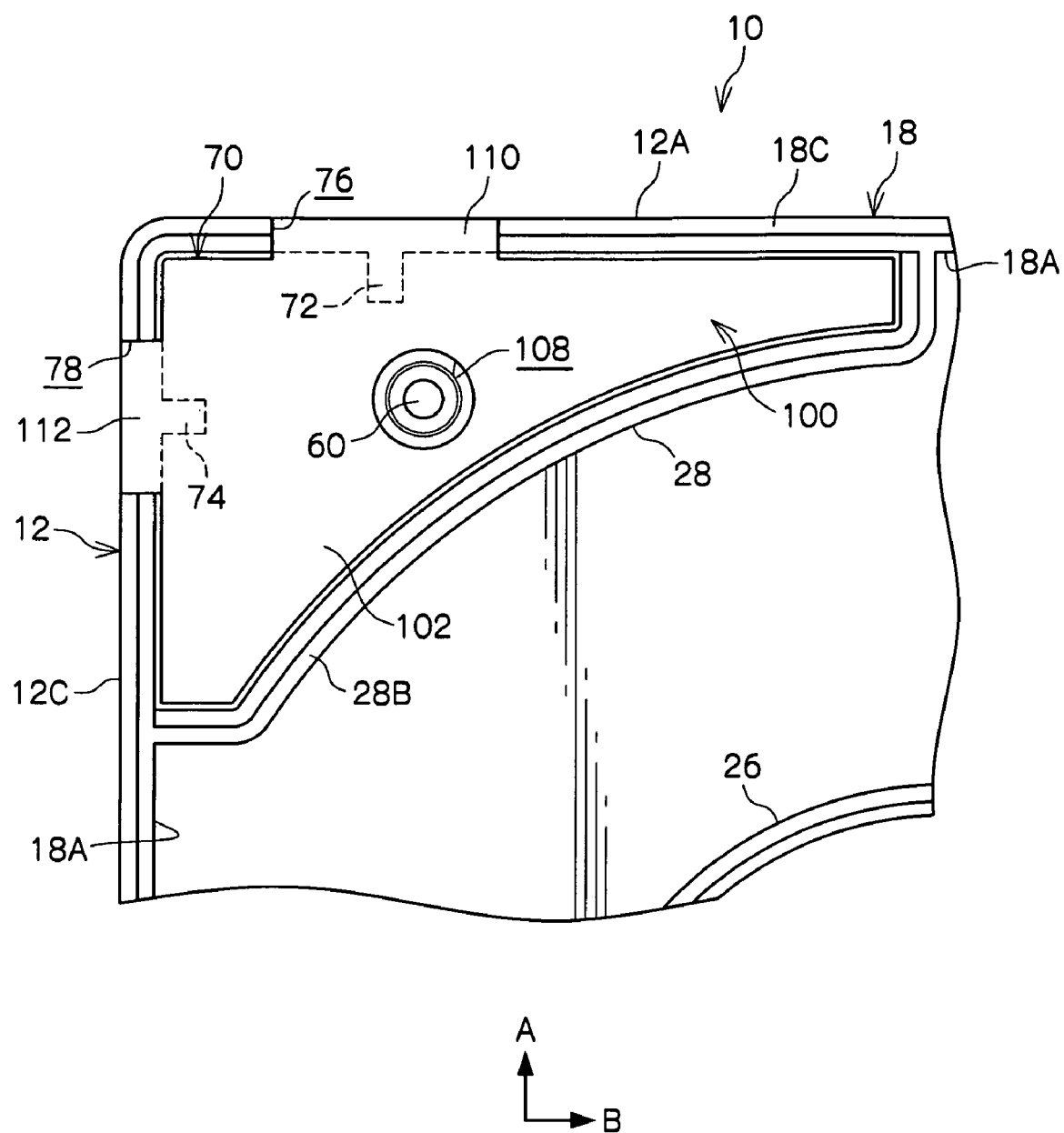
FIG. 4 is a schematic plan view illustrating the IC tag housed in the housing portion.

The play restricting walls 28 will be described in detail. As illustrated in FIG. 3, a step portion 28B that protrudes upward is formed on the inner circumferential surface from the substantially center portion in the diameter direction of the upper end face of the play restricting wall 28 of the lower case 18. A step portion (not illustrated) that protrudes downward is formed on the outer circumferential surface from the substantially center portion in the diameter direction of the lower end face of the play restricting wall 28 of the upper case 16.

When the upper case 16 and the lower case 18 are joined, the step portion of the play restricting wall 28 of the upper case 16 and the step portion 28B of the play restricting wall 28 of the lower case 18 engage each other to form a labyrinth configuration in the engaged portion. This may prevent the entry of dust into the housing area of the reel 14 (the dust-proof properties are secured).

Figure 6:
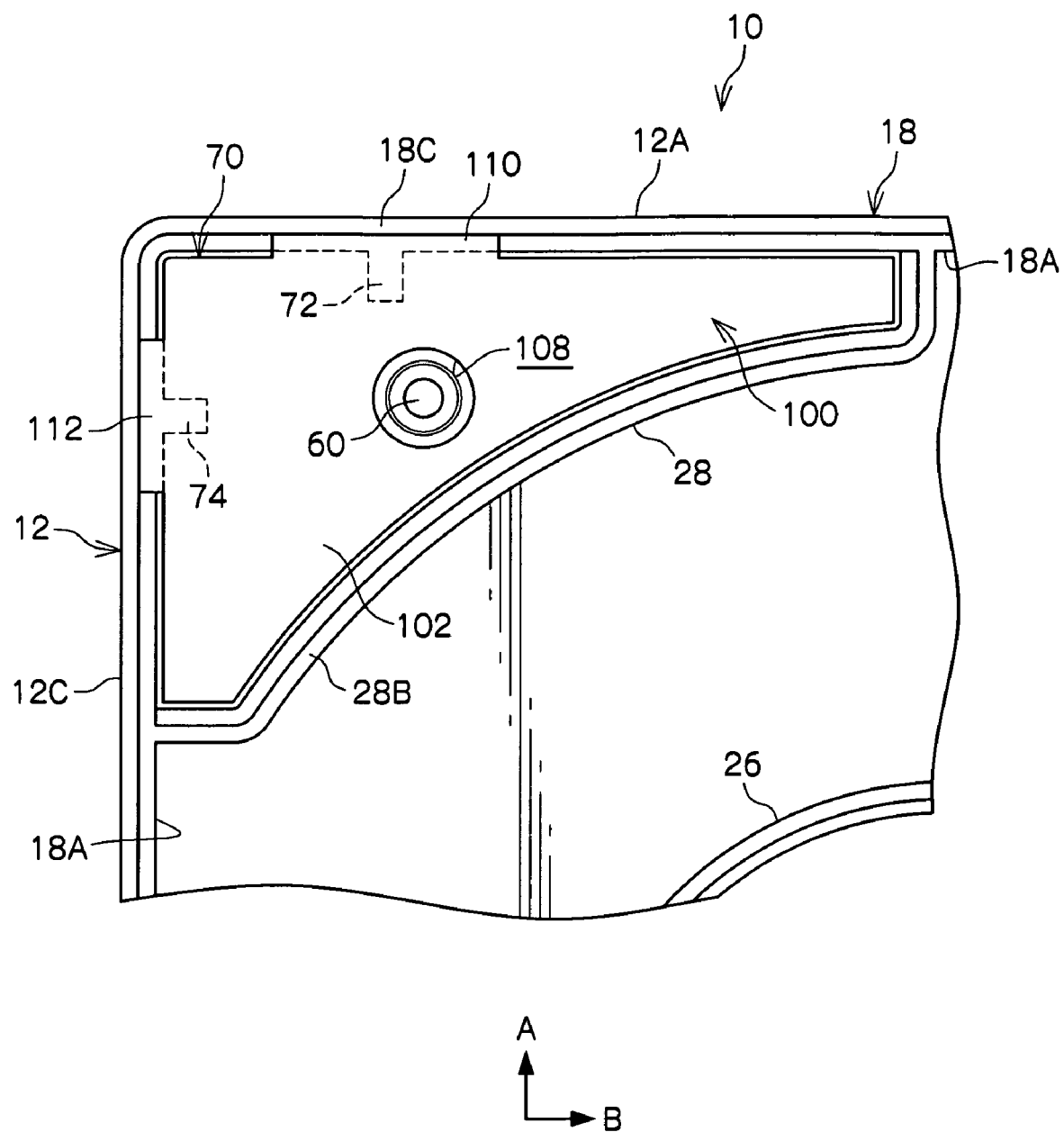
FIG. 6 is a schematic plan view illustrating the IC tag housed in the housing portion.

A step portion 18C is formed on the outer peripheral surface side from the substantially center portion in the radial direction of the upper end face of the peripheral wall 18A of the lower case 18, and a step portion 16B is formed on the inner peripheral surface from the substantially center portion in the radial direction of the lower end face of the peripheral wall 16A of the upper case 16 (see FIG. 6). When the upper case 16 and the lower case 18 are joined, the step portion 16B of the upper case 16 engages the step portion 18C of the lower case 18 to form the labyrinth configuration in the engaged portion.

As illustrated in FIGS. 2 to 6, the space in a substantially triangular shape in plan view at least between the play restricting wall 28 of the lower case 18 and the front wall 12A of the case 12 (the peripheral wall 18A forwardly of the case 12) in the left front corner (cornered portion) on the opposite side in the left-right direction of the opening 20 is a housing portion 70. The housing portion 70 houses a later-described planar IC tag (RFID (radio frequency identification) tag) 100.

The IC tag 100 is housed in the housing portion 70 such that its normal line direction is the rotational axial direction of the reel 14 (housed in the horizontal posture). The IC tag 100 is supported from below by the bag portion 29 in the housing portion 70. A through hole 108 for penetrating (allowing (entering)) the screw boss 60 therethrough is formed in the IC tag 100. The screw boss 60 may be only allowed in the through hole 108. A cut-away portion (not illustrated), which is not the through hole 108, may be formed in the IC tag 100.

Supporting ribs (supporting portions) 72 and 74 are formed on the inner surfaces of the front wall 12A (the peripheral wall 18A forwardly of the case 12) and the left wall 12C (the peripheral wall 18A leftwardly of the case 12) of the case 12 in the housing portion 70. The supporting ribs (supporting portions) 72 and 74 have a predetermined width (thickness) and a predetermined length, and position and support at least the peripheral edges of the IC tag 100, in particular, the peripheral edges including protruding portions 110 and 112 in a substantially rectangular shape in plan view that are integrally formed so as to protrude at a predetermined width and a predetermined length toward the front and left sides of the case 12, from below (or position the up-down direction).

The height of the supporting ribs 72 and 74 is substantially the same as that of the peripheral wall 18A except for the step portion 18C. The supporting ribs 72 and 74 are formed in a trapezoidal shape in which the lower end is longer than the upper end in side view (see FIGS. 9A and 9B). This structure may secure the strength (rigidity) of the supporting ribs 72 and 74. The IC tag 100 may be supported sufficiently.

Portions of the step portion 18C of the peripheral wall 18A, joined to the supporting ribs 72 and 74, are cut away at a predetermined width and a predetermined depth (height). Cut-away portions 76 and 78 have a width substantially the same as that of the protruding portions 110 and 112. The cut-away portions 76 and 78 are formed on the upper end face of the peripheral wall 18A, joined to the supporting ribs 72 and 74, at a depth (height) substantially equal to the plate thickness of the protruding portions 110 and 112 so as to house the protruding portions 110 and 112.

The protruding portions 110 and 112 formed at the peripheral edges of the IC tag 100 are housed in the cut-away portions 76 and 78, so the front-rear direction and the left-right direction are positioned. In this state, the IC tag 100 is sandwiched between the peripheral wall 16A of the upper case 16 and the peripheral wall 18A of the lower case 18. Thus, the IC tag 100 is positioned and fixed in the housing portion 70.

Figure 5:
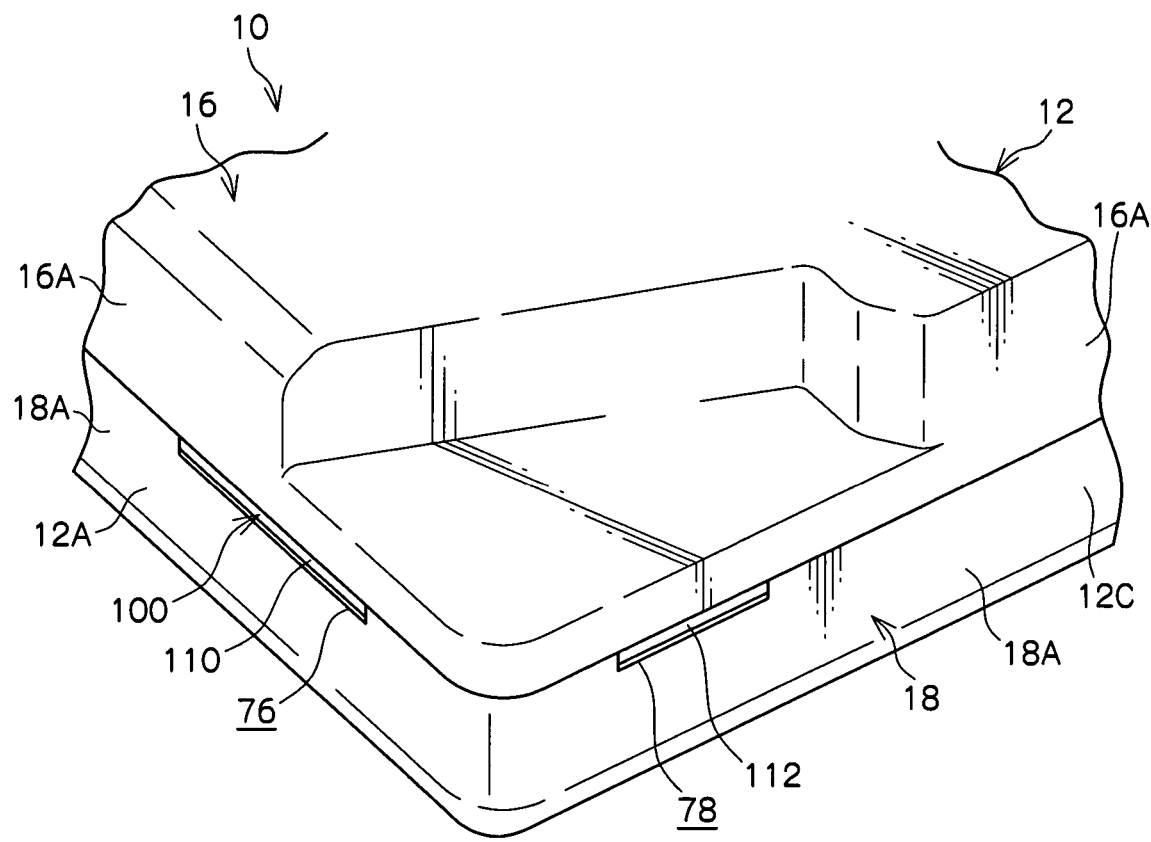
FIG. 5 is a schematic perspective view illustrating the IC tag housed in the housing portion.

In this case, as illustrated in FIG. 5, the protruding portions 110 and 112 of the IC tag 100 are exposed from the cut-away portions 76 and 78 formed in the front wall 12A and the left wall 12C of the case 12 (the peripheral wall 18A of the lower case 18).

Accordingly, as illustrated in FIG. 6, the length of the protruding portions 110 and 112 is shortened by the plate thickness of the step portion 18C. The cut-away portions 76 and 78 may not be formed in the peripheral wall 18A of the lower case 18.

In such configuration, the IC tag 100 is not exposed from the front wall 12A and the left wall 12C of the case 12, which is preferable in appearance. In this case, when the supporting ribs 72 and 74 are formed in the upper case 16, and when joining the upper case 16 and the lower case 18, the protruding portions 110 and 112 are desirably sandwiched between the supporting ribs 72 and 74 opposite each other.

Figure 7:
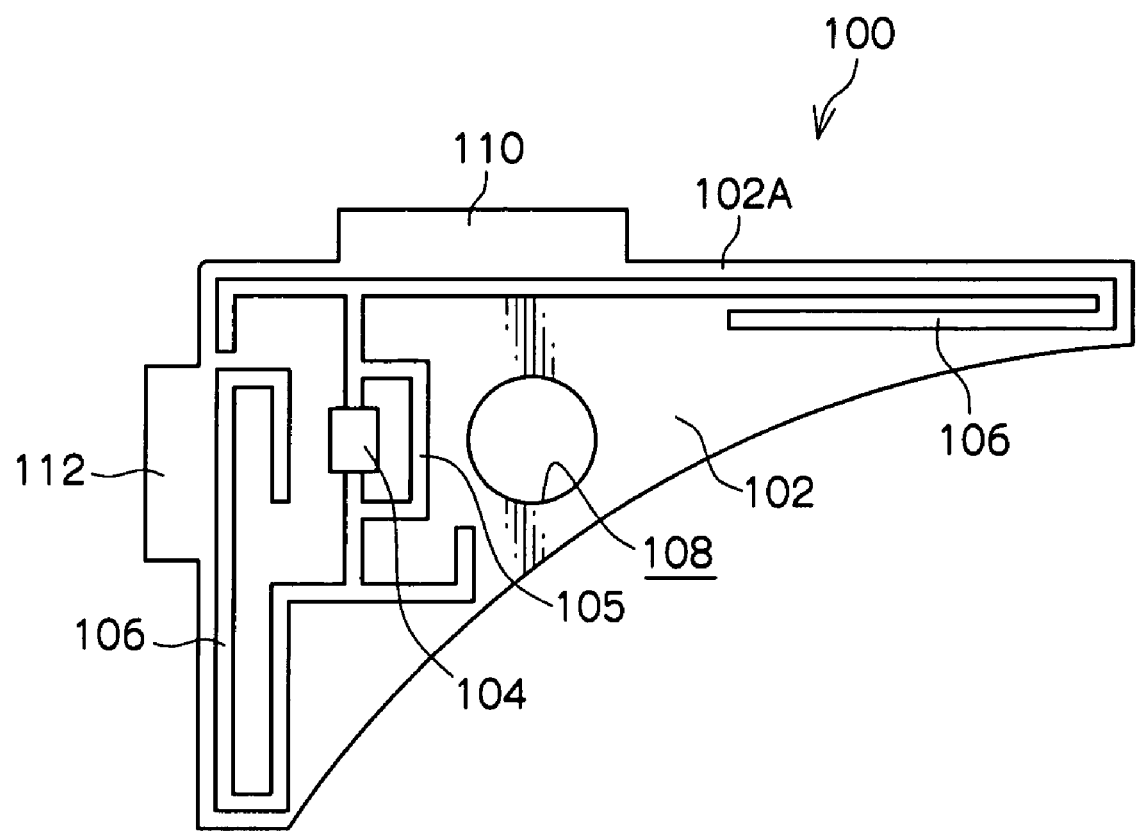
FIG. 7 is a schematic plan view of the IC tag.

As illustrated in FIG. 7, the IC tag 100 has an IC portion 104 that has an IC chip on a thin, planar (film-like) substrate 102 that has a substantially triangular shape in plan view and flexibility so as to be housed in the housing portion 70 in the substantially horizontal posture, and an antenna portion (dipole antenna) 106 connected to the IC portion 104.

More specifically, the IC tag 100 has the IC portion 104 in the substantially center portion except for the through hole 108 of the substrate 102. The antenna portion 106 has pole antennas extended from the plus side and the minus side of the IC portion 104. Each of the pole antennas has a length equal to 75 mm (a length equal to 150 mm by totaling the length of the plus side and the minus side).

The length of the antenna portion 106 is adjusted as needed in consideration of the dielectric constant of the material (the case 12 or the recording tape T) that exists near the antenna portion 106. When only atmosphere exists near the antenna portion 106, its dielectric constant is 1.0 and the length of the antenna portion 106 is the above length. When the antenna portion 106 is covered by a material (such as ceramic) having a high dielectric constant (n=5 to 10), the apparent wavelength is shortened. The length of the antenna portion 106 may be shorter than the above length.

The IC tag 100 can be accessed in a non-contact manner by a reading and writing device (not illustrated) of the typical (inexpensive) radio frequency (electric wave) communication type (e.g., a 900 MHz bandwidth and a communication distance of 4 m or less), not by a reading and writing device (not illustrated) of the electromagnetic (magnetic field) induction type (e.g., a 13.56 MHz bandwidth and a communication distance of 0.6 m or less) that may access the memory board M in a non-contact manner.

The IC portion 104 need to be adjusted to the frequency of a received electric wave (a resonant frequency), but the IC portion 104 can be accessed at a frequency (e.g., 900 MHz in a UHF bandwidth) different from that of the memory board M to read and write information. The IC portion 104 may be used as an inventory controlling portion or a burglar-prevention portion such as individual central control of the recording tape cartridge 10 when storing changed from a bar code label and continuous transporting by the auto-loader.

The storage capacity of the IC portion 104 is for example 96 to 240 bits (12 to 30 bytes) and is a relatively small capacity. To make the IC portion 104 smaller and extend the communication distance, the power consumption need to be reduced. The storage capacity of the IC portion 104 is small, but the recording tape cartridge 10 on which the memory board M is mounted may distribute information stored. So, the storage capacity may be secured so as to respond to the degree of freedom of the user. Note that the same information as that of the memory board M may be stored in the IC portion 104, as needed.

The illustrated IC tag 100 may respond to both the electromagnetic (magnetic field) induction type and the radio frequency communication type. The antenna portion 106 is connected to the IC portion 104 and is extended in the longitudinal direction of the substrate 102. Such antenna portion 106 functions as the antenna of the radio frequency communication type. An antenna portion 105 that is connected in loop near the IC portion 104 functions as the antenna of the electromagnetic (magnetic field) induction type.

The operation of the recording tape cartridge 10 will be described. When the recording tape cartridge 10 is not used (during storage or carriage), the opening 20 is closed by the door 50. Specifically, the door 50 is biased in the closing direction of the opening 20 at all times by the biasing force of the coil spring 56. The door 50 closes the opening 20 such that the front end of the door 50 enters into the guide wall portions 41 near the inclined wall portions 30.

The plural recording tape cartridges 10 are stored in the library device in this state. A reading and writing device provided in a robot hand, not illustrated, accesses the memory board M from the rear surface (rear wall) of each of the recording tape cartridges 10 to read various information such as the recording capacity stored in the memory board M. The reading and writing device transmits the information to a controller (not illustrated). The drive device that is optimum for each of the recording tape cartridges 10 (or may record and reproduce each of the recording tape cartridges 10) is prospectively identified by the controller.

When the recording tape T is used, one of the recording tape cartridges 10 is taken out from the library device by the robot hand. The recording tape cartridge 10 is inserted into the drive device along the arrow A direction. The drive device is selected after reading the information stored in the memory board M. The recording tape cartridge 10 is inserted smoothly and efficiently into the drive device by the robot hand. With the insertion, an opening and closing member (not illustrated) of the drive device enters into the slit 40 opened forward to engage the operating protrusion 52 of the door 50.

In this state, the recording tape cartridge 10 (the case 12) is pushed in the arrow A direction. The opening and closing member moves the operating protrusion 52 rearward against the biasing force of the coil spring 56 by the pushing force (or moves the operating protrusion 52 relatively to the case 12 inserted in the arrow A direction rearward). The door 50 in which the operating protrusion 52 is protruded is rotated clockwise in plan view along the curving direction of the door 50 while the convex portions 51 are guided by the guide wall portions 42.

The door 50 is moved substantially rearward by the guide wall portions 42 so as to be moved around the outside of the pin holding portions 24 and the reel 14 without extending off the moving track along the curved shape of the door 50 and then opens the opening 20. When the case 12 (the recording tape cartridge 10) is inserted into the drive device at a predetermined depth, the opening 20 is completely opened and is positioned. The reading and writing device provided in the drive device accesses the memory board M from the lower surface of the recording tape cartridge 10 to read various information stored in the memory board M and writes individual information, if necessary.

In the state that the opening 20 is opened, the recording tape cartridge 10 is positioned in the drive device. The further rotation of the door 50 (the movement substantially rearward) is restricted. The drawing-out member of the drive device enters into the case 12 from the opened opening 20. The leader pin 22 positioned and held by the pin holding portions 24 is pulled out and is then housed in a winding reel, not illustrated. The winding reel and the reel 14 are synchronized and rotationally driven. The recording tape T is wound around the winding reel so as to be sequentially drawn from the case 12. Information is recorded or reproduced by a recording and reproducing head (not illustrated) disposed along a predetermined tape path.

The recording tape T is rewound around the reel 14 to discharge the recording tape cartridge 10 from the drive device. The positioning state of the recording tape cartridge 10 is released. The recording tape cartridge 10 is moved in the opposite direction of the arrow A direction by the biasing force of the coil spring 56 or an eject mechanism, not illustrated. The door 50 is rotated in the closing direction of the opening 20 by the biasing force of the coil spring 56 while the convex portions 51 of the door 50 is guided by the guide wall portions 42. The front end of the door 50 enters into the guide wall portions 41 to completely close the opening 20 for returning to the initial state.

There will be described the operation of the housing portion 70 that holds the IC tag 100 that stores various information (the inventory controlling section such as the individual central control of the recording tape cartridge 10), aside from the memory board M. In the manufacturing process of the recording tape cartridge 10, the IC tag 100 is supplied to the lower case 18 by the robot hand. The housing portion 70 that may house the IC tag 100 is formed in the lower case 18. The IC tag 100 is arranged in a predetermined position in the case 12 with high accuracy.

The housing portion 70 is formed between the play restricting wall 28 on the opposite side in the left-right direction of the opening 20 and the left front corner (cornered portion) of the case 12. The IC tag 100 is housed in the housing portion 70 in the horizontal posture (such that the rotational axis direction of the reel 14 is a normal line direction). The screw boss 60 and the bag portion 29 exist in the housing portion 70. The screw boss 60 is penetrated through the through hole 108 formed in the substrate 102 of the IC tag 100. A portion of the substrate 102 is supported by the bag portion 29 from below.

In the housing portion 70, the supporting ribs 72 and 74 are formed at least on the inner surface of the peripheral wall 18A of the lower case 18 (the front wall 12A and the left wall 12C). The supporting portions 72 and 74 support the peripheral edges of the IC tag 100, in particular, the peripheral edges formed with the protruding portions 110 and 112 from below, and restrict (position) the position in the up-down direction of the IC tag 100. The cut-away portions 76 and 78 that allow the protruding portions 110 and 112 are formed in the upper end face of the peripheral wall 18A in the portions formed with the supporting ribs 72 and 74.

In the IC tag 100, the substrate 102 is supported by the bag portion 29 from below and also the peripheral edges including the protruding portions 110 and 112 are supported by the supporting ribs 72 and 74 from below. Further, the protruding portions 110 and 112 are housed in the cut-away portions 76 and 78. Not only the up-down direction, but also the front-rear direction and the left-right direction, are positioned. Therefore, the IC tag 100 that has a certain amount of a size (area) is housed and arranged in the horizontal posture in the housing portion 70 with high position accuracy.

That is, by this structure, the attached region of the IC tag 100 can be secured in the case 12. Further, the IC tag 100 can be satisfactorily positioned and arranged in the case 12. Accordingly, in the reading and writing device that accesses the IC tag 100 from the up-down direction (the rotational axis direction of the reel 14) of the case 12 to read and write information, any reading error or any writing error may be hard to occur.

Figure 8:
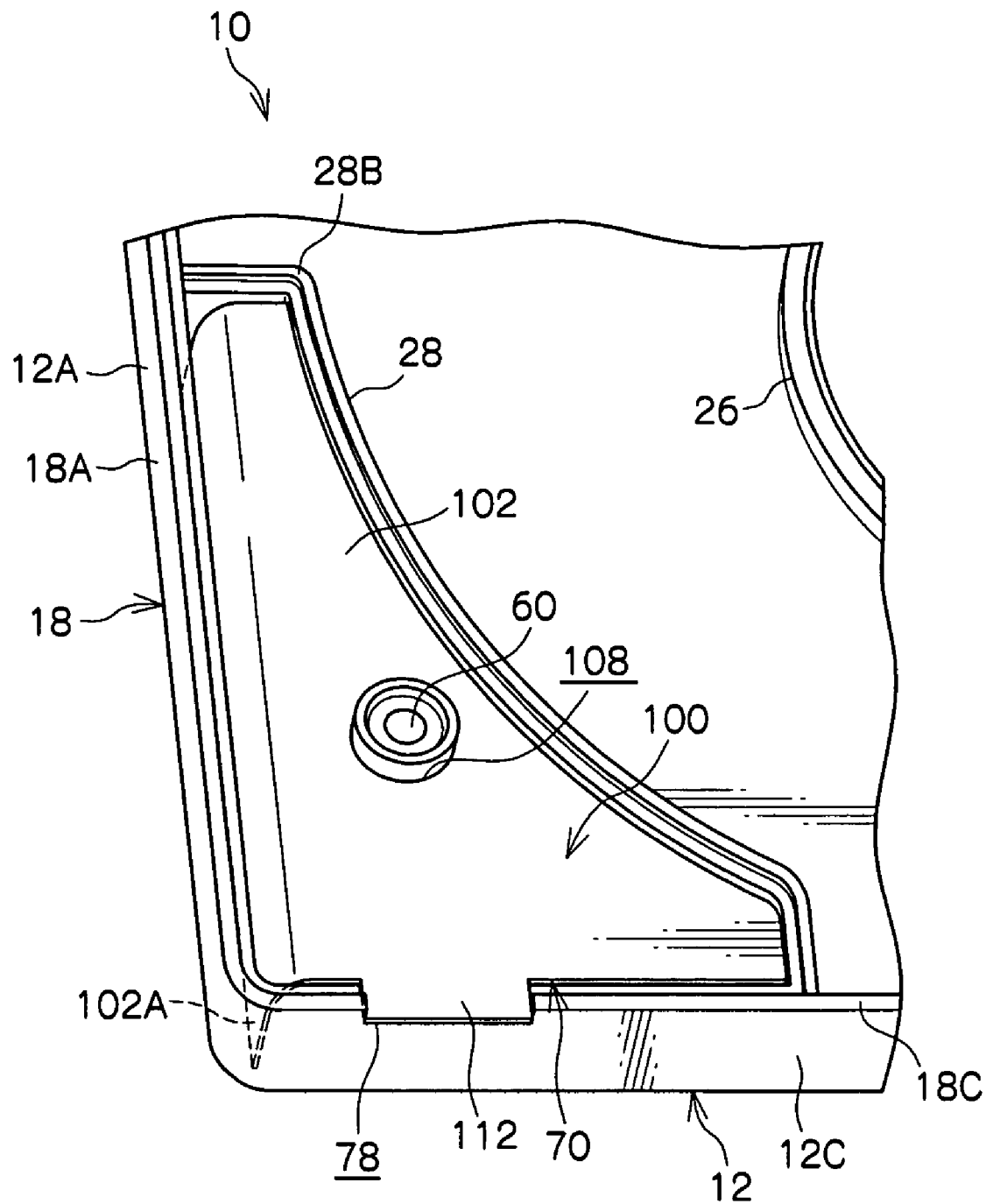
FIG. 8 is a schematic perspective view illustrating the IC tag housed in the housing portion.

As illustrated in FIG. 8, a portion of the IC tag 100 forwardly of the case 12 (a front end 102A of the substrate 102 including the antenna portion 106 illustrated in FIG. 7) may be folded downward (in the rotational axis direction of the reel 14) to house the IC tag 100 in the housing portion 70. That is, a portion of the antenna portion 106 may be faced the front wall 12A of the case 12 to house the IC tag 100 in the housing portion 70.

In such configuration, the IC tag 100 may be accessed, not only from the up-down direction of the case 12 (the rotational axis direction of the reel 14), but also from the front-rear direction of the case 12 (the direction orthogonal to the rotational axis direction of the reel 14). The communication performance for accessing the IC tag 100 may be improved.

Figure 9A:
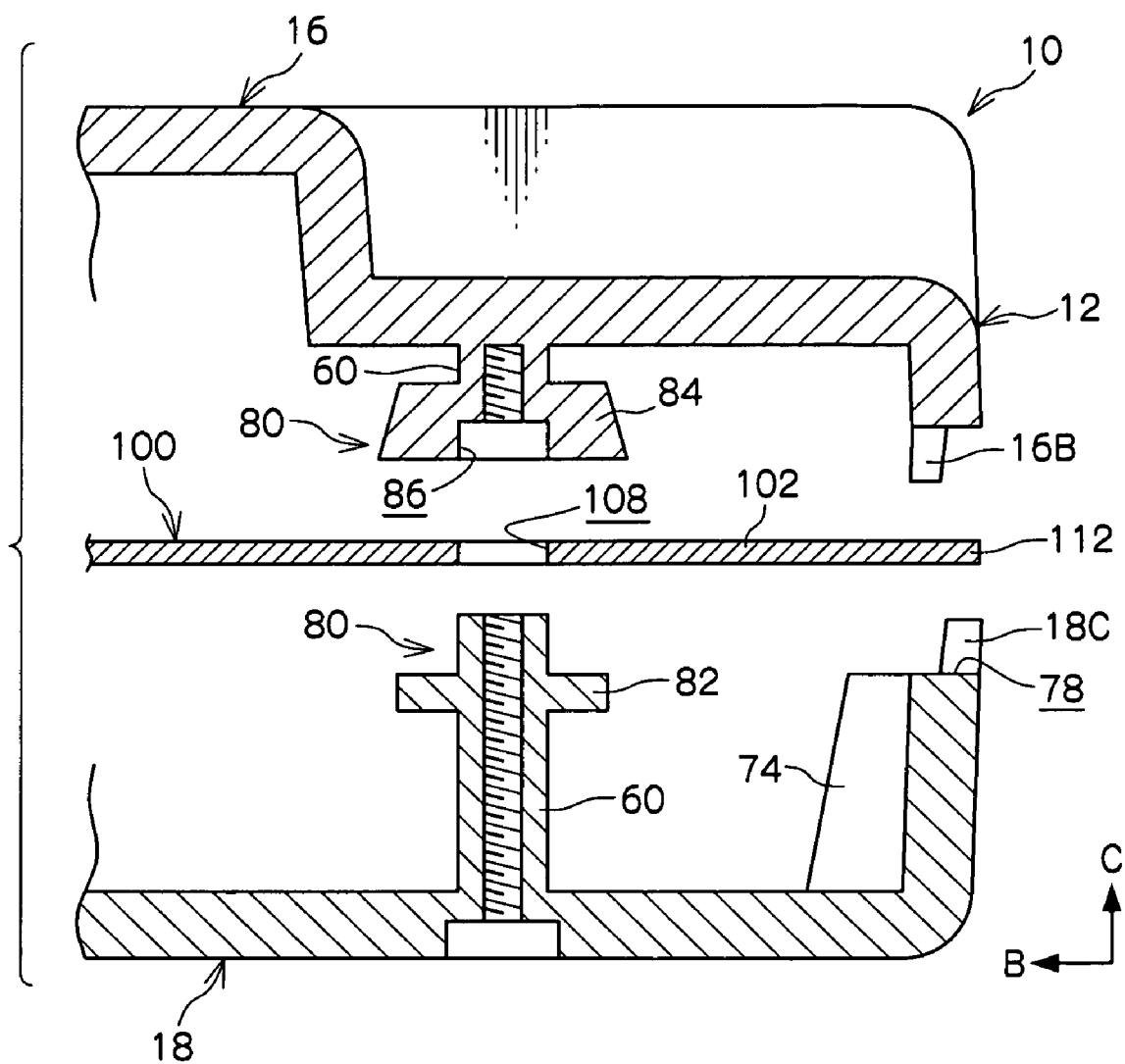
FIGS. 9A and 9B are schematic sectional views illustrating a holding configuration that holds the IC tag housed in the housing portion by a screw boss.
Figure 9B:
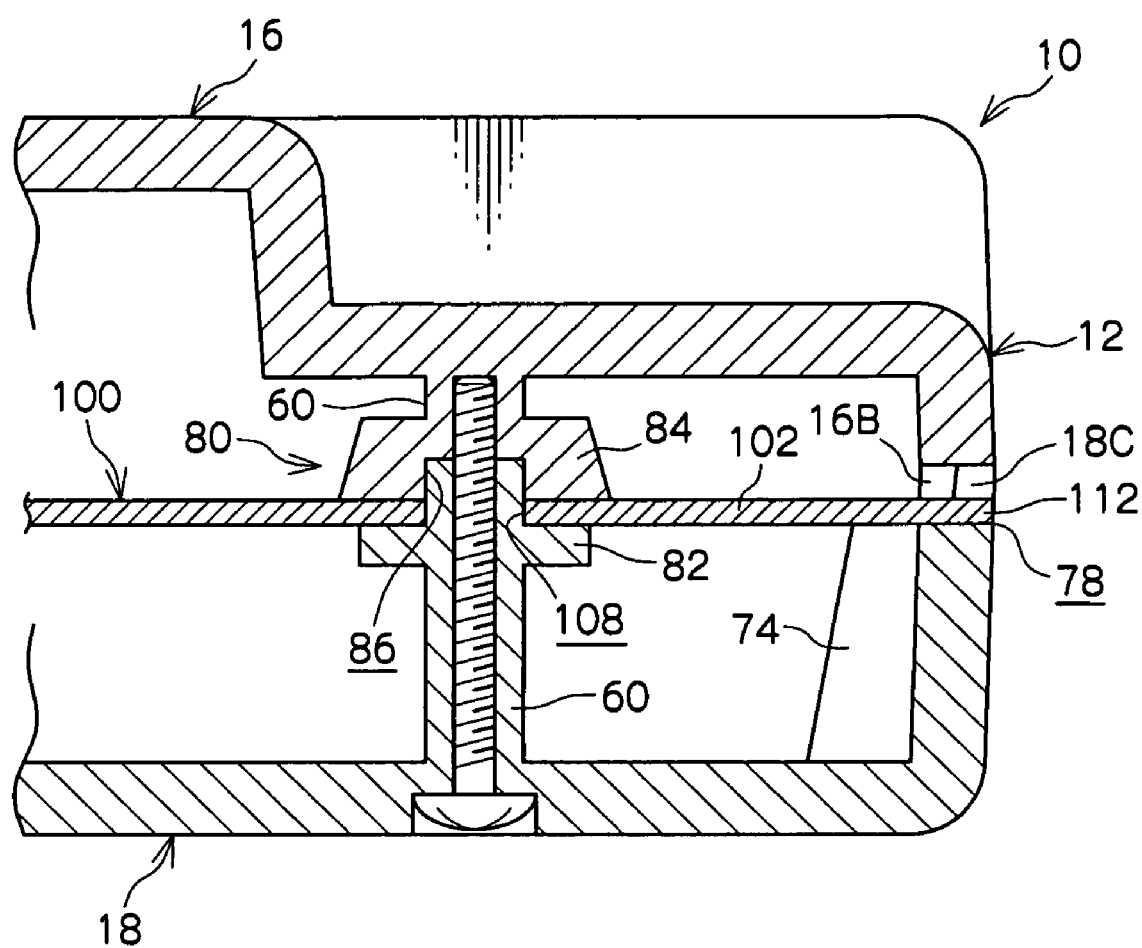

In this case, only the protruding portion 112 that is protruded toward the left wall 12C of the case 12 is a portion of the IC tag 100 that is sandwiched between the peripheral wall 16A of the upper case 16 and the peripheral wall 18A of the lower case 18. In this case, the fixing of the IC tag 100 in the housing portion 70 may be insufficient. As illustrated in FIGS. 9A and 9B, it is desirable that a holding configuration 80 be formed in the screw boss 60 to hold the IC tag 100.

As illustrated in FIG. 9A, the holding configuration 80 has a flange portion 82 that is integrally formed with the outer peripheral surface lower than the upper end (the upper end face) of the screw boss 60 of the lower case 18 by a predetermined amount, and a flange portion 84 that is integrally formed on the outer peripheral surface at the lower end of the screw boss 60 of the upper case 16.

The flange portion 84 of the screw boss 60 of the upper case 16 is formed in a substantially trapezoidal shape in side cross-sectional view. A concave portion 86 in a circular shape in bottom view in which the upper end of the screw boss 60 of the lower case 18 may be fitted is formed in the center portion of the lower end face. The shape of the concave portion 86 may be changed, as needed, according to the shape of the screw boss 60. In this case, the screw boss 60 is cylindrically formed, so has a circular shape in bottom view.

In the holding configuration 80, the upper end of the screw boss 60 of the lower case 18 is penetrated through the through hole 108 of the IC tag 100. The substrate 102 of the IC tag 100 around the through hole 108 is supported by the upper surface of the flange portion 82 that is formed in the predetermined position of the outer peripheral surface of the screw boss 60. The upper end of the screw boss 60 is protruded upward from the through hole 108.

In this state, the upper case 16 covers the lower case 18. So, the upper end of the screw boss 60 of the lower case 18 that is protruded upward from the through hole 108 of the IC tag 100 is fitted in the concave portion 86 that is formed at the lower end of the screw boss 60 of the upper case 16.

As illustrated in FIG. 9B, the flange portion 82 that is formed in the screw boss 60 of the lower case 18 and the flange portion 84 that is formed in the screw boss 60 of the upper case 16 can sandwich the IC tag 100 (the substrate 102) from the up-down direction. The screw 90 is screwed into the screw boss 60 from the lower surface of the lower case 18 to sufficiently position and fix the IC tag 100 in the housing portion 70 (in particular, the up-down direction).

As described above, according to this exemplary embodiment, the attached region of the IC tag 100 can be secured in the case 12 and the IC tag 100 can be easily attached to the inside of the case 12 with high position accuracy. The IC tag 100 is provided in the housing portion 70 in the horizontal posture (such that the rotational axis direction of the reel 14 is a normal line direction). In this case, the IC tag 100 can be easily attached by the robot hand or the like and the attaching properties can be improved.

It is desirable that the IC tag 100 be accessed from the back label side (the rear surface side of the case 12). It is desirable that at least a portion of the antenna portion 106 be disposed so as to be directed in the front-rear direction and the left-right direction of the case 12 (the direction orthogonal to the rotational axis direction of the reel 14). As illustrated in FIG. 8, it is desirable that a portion of the IC tag 100 including the antenna portion 106 (e.g., the front end 102A) be folded in the down direction and housed (the rotational axis direction of the reel 14 is enough, so, it is possible to be folded in the up direction).

By this structure, the communication distance accuracy of the reading and writing device for the IC tag 100 can be improved. An electromagnetic wave (UHF bandwidth) that is transmitted from the reading and writing device can be stably received by the entire antenna portion 106 of the IC tag 100. The reading accuracy and the writing accuracy can be improved. Any reading error and any writing error may not occur.

To secure the region of the antenna portion 106, it is desirable to make the size (area) of the IC tag 100 as large as possible. As illustrated, it is desirable that the IC tag 100 be formed to substantially the same size as that of the housing portion 70 in plan view. In any case, the recording tape cartridge 10 incorporates the IC tag 100 and can be differentiated from other recording tape cartridges.

The recording tape cartridge 10 according to this exemplary embodiment is not limited to the illustrated one and the design may be changed in the scope without departing from the purport of the invention, as needed. The play restricting wall 28 may be formed at least in the lower case 18 and may not be formed in the upper case 16.

In the exemplary embodiment, each of the supporting ribs 72 and 74 is formed corresponding to each of the cut-away portions 76 and 78. Plural supporting ribs 72 and 74 may be formed corresponding to each of the cut-away portions 76 and 78. The supporting ribs 72 and 74 may be formed in the appropriate positions of the peripheral wall 18A, not in the cut-away portions 76 and 78. The recording tape cartridge 10 of the above example has the leader pin 22 as a leader member. The recording tape cartridge 10 may have a leader tape or a leader block which is not illustrated in the drawings.

The RFID (the IC tag 100) may be of the type that reading or writing of information in not performed (or that does not have the function of storing information). There may be used the type, upon reception of an electric wave at a predetermined frequency (e.g., 2.45 GHz bandwidth), that returns an electric wave at a specific frequency. The communication distance of the RFID (the IC tag 100) of this type is 1.5 m or less but the antenna portion 106 may be smaller.

The door 50 that is slid in a substantially arcuate shape in plan view is not limited and may be a door that is slid in a straight line. The recording tape T is grasped as an information recording and reproducing medium that has a long tape shape and may record information and reproduce the recorded information. Needless to say, the recording tape cartridge 10 may be applied to the recording tape T of any recording and reproducing type.

What is claimed is:

1. A recording tape cartridge comprising:
    a case that includes an upper case and a lower case and houses a reel around which a recording tape is wound, the upper case comprising a peripheral wall which forms a side-wall of the upper case and extends in a rotational axis direction of the reel, and the lower case comprising a peripheral wall which forms a side-wall of the lower case and extends in the rotational axis direction of the reel, wherein a lower portion of the peripheral wall of the upper case and an upper portion of the peripheral wall of the lower case abut each other;
    a restricting wall that is formed at least in the lower case and defines an area in which the reel is housed;
    a housing portion that is formed between the restricting wall and a corner portion of the case; and
    a planar radio frequency identification tag that is provided in the housing portion such that the rotational axis direction of the reel is a normal line direction of the planar radio frequency identification tag,
    wherein the radio frequency identification tag includes a main portion and a peripheral edge portion, and
    wherein the main portion of the radio frequency identification tag is positioned between the abutting lower portion of the peripheral wall of the upper case and the upper portion of the peripheral wall of the lower case, such that the rotational axis direction of the reel is the normal line direction of the main portion of the radio frequency identification tag.

2. The recording tape cartridge of claim 1, wherein a part of an antenna portion of the radio frequency identification tag is folded toward the rotational axis direction of the reel.

3. The recording tape cartridge of claim 2, wherein the peripheral edge portion of the radio frequency identification tag is sandwiched between the peripheral wall of the upper case and the peripheral wall of the lower case.

4. The recording tape cartridge of claim 3, wherein the radio frequency identification tag is supported from below by a supporting portion formed in the lower case.

5. The recording tape cartridge of claim 4, wherein the radio frequency identification tag is held by a holding mechanism that is formed in a screw boss into which a screw that joins the upper case and the lower case is screwed.

6. The recording tape cartridge of claim 2, wherein an one end portion of the radio frequency identification tag at which the part of the antenna portion of the radio frequency identification tag is formed is folded toward the rotational axis direction of the reel, and another end portion at a peripheral edge portion of the radio frequency identification tag is sandwiched between the peripheral wall of the upper case and the peripheral wall of the lower case.

7. The recording tape cartridge of claim 1, wherein the peripheral edge portion of the radio frequency identification tag is sandwiched between the peripheral wall of the upper case and the peripheral wall of the lower case.

8. The recording tape cartridge of claim 7, wherein the radio frequency identification tag is supported from below by a supporting portion formed in the lower case.

9. The recording tape cartridge of claim 8, wherein a protruding portion that is formed at the peripheral edge portion of the radio frequency identification tag is supported at the supporting portion.

10. The recording tape cartridge of claim 7, wherein a protruding portion that is formed at the peripheral edge portion of the radio frequency identification tag is sandwiched between the peripheral wall of the upper case and the peripheral wall of the lower case.

11. The recording tape cartridge of claim 1, wherein the radio frequency identification tag is supported from below by a supporting portion formed in the lower case.

12. The recording tape cartridge of claim 1, wherein the radio frequency identification tag is held by a holding mechanism that is formed in a screw boss into which a screw that joins the upper case and the lower case is screwed.

13. The recording tape cartridge of claim 12, wherein a penetration portion for the screw boss is formed at the radio frequency identification tag.

14. The recording tape cartridge of claim 12, wherein the holding mechanism includes a first flange portion formed at the screw boss at the lower case side and a second flange portion formed at the screw boss at the upper case side.

15. The recording tape cartridge of claim 1, wherein protruding portions that are formed at the peripheral edge portions of the radio frequency identification tag are supported at supporting portions formed in the lower case respectively.

16. The recording tape cartridge of claim 1, wherein the shape of the radio frequency identification tag in a state in which the radio frequency identification tag is housed in the housing portion and the shape of the housing portion are substantially the same when seen from the rotational axis direction of the reel.

17. A recording tape cartridge comprising:
- a case that includes an upper case and a lower case and houses a reel around which a recording tape is wound;
- a restricting wall that is formed at least in the lower case and defines an area in which the reel is housed;
- a housing portion that is formed between the restricting wall and a corner portion of the case; and
- a planar radio frequency identification tag that is provided in the housing portion such that a rotational axis direction of the reel is a normal line direction of the planar radio frequency identification tag, wherein the shape of the radio frequency identification tag in a state in which the radio frequency identification tag is housed in the housing portion and the shape of the housing portion are substantially the same when seen from the rotational axis direction of the reel, wherein the radio frequency identification tag includes a main portion and a peripheral edge portion, and wherein the main portion of the radio frequency identification tag is positioned between a lower portion of a peripheral wall of the upper case and an upper portion of a peripheral wall of the lower case such that the rotational axis direction of the reel is the normal line direction of the main portion of the radio frequency identification tag.

18. A recording tape cartridge comprising:
- a case that includes an upper case and a lower case and houses a reel around which a recording tape is wound;
- a restricting wall that is formed at least in the lower case and defines an area in which the reel is housed;
- a housing portion that is formed between the restricting wall and a corner portion of the case; and
- a planar radio frequency identification tag that is provided in the housing portion such that a rotational axis direction of the reel is a normal line direction of the planar radio frequency identification tag, wherein the radio frequency identification tag is held by a holding mechanism that is formed in a screw boss into which a screw that joins the upper case and the lower case is screwed.

* * * * *